United States Patent
Armitage et al.

(10) Patent No.: US 6,874,228 B2
(45) Date of Patent: Apr. 5, 2005

(54) PROPSHAFT ASSEMBLY WITH VIBRATION ATTENUATION AND ASSEMBLY METHOD THEREFOR

(75) Inventors: Mary Ellen Armitage, Kalamazoo, MI (US); Jeffrey N. Heaton, White Lake, MI (US); David P. Schankin, Harper Woods, MI (US); Donald J. Kurecka, Rochester Hills, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 10/821,157

(22) Filed: Apr. 8, 2004

(65) Prior Publication Data

US 2004/0192451 A1 Sep. 30, 2004

Related U.S. Application Data

(63) Continuation of application No. 10/097,701, filed on Mar. 13, 2002, now Pat. No. 6,752,722.

(51) Int. Cl.[7] .................. B23P 17/00; B23Q 17/12; F16C 3/00
(52) U.S. Cl. ............... 29/888; 29/889.61; 29/407.07; 464/127; 464/180
(58) Field of Search .................. 29/889.61, 888, 29/407.07, 428; 464/180, 127

(56) References Cited

U.S. PATENT DOCUMENTS

| | | | |
|---|---|---|---|
| 2,001,166 A | 5/1935 | Swennes | |
| 2,011,165 A | 5/1935 | Swennes | |
| 2,017,609 A | 10/1935 | Sparrow | |
| 2,109,937 A | 3/1938 | Trbojevich | |
| 2,751,765 A | 6/1956 | Rowland et al. | |
| 2,838,957 A | 6/1958 | Johnson | |
| 2,889,695 A * | 6/1959 | Moeller | 464/180 |
| 3,075,406 A | 1/1963 | Butler, Jr. et al. | |
| 3,659,434 A | 5/1972 | Wolfe | |
| 4,014,184 A | 3/1977 | Stark | |
| 4,207,957 A * | 6/1980 | Sivers et al. | 180/380 |
| 5,243,880 A * | 9/1993 | Beier et al. | 74/607 |
| 5,326,324 A | 7/1994 | Hamada | |
| 5,397,272 A | 3/1995 | Smiley et al. | |
| 5,646,470 A | 7/1997 | de Groot | |
| 5,904,622 A | 5/1999 | Breese et al. | |
| 6,023,830 A | 2/2000 | Cole et al. | |
| 6,234,911 B1 | 5/2001 | Breese et al. | |
| 6,450,890 B1 | 9/2002 | Hendrian et al. | |
| 6,623,365 B1 | 9/2003 | Maretzke et al. | |
| 2003/0153391 A1 * | 8/2003 | Kawakami | 464/180 |

FOREIGN PATENT DOCUMENTS

| | | |
|---|---|---|
| EP | 81110597.2 | 12/1981 |
| GB | 986715 | 3/1965 |
| GB | 1462170 | 1/1977 |
| GB | 2 202 029 A | 9/1988 |
| JP | 1-127416 | 5/1989 |
| JP | 3-181638 | 5/1991 |

* cited by examiner

*Primary Examiner*—Eric Compton
(74) *Attorney, Agent, or Firm*—Harness, Dickey & Pierce P.L.C.

(57) ABSTRACT

A shaft structure and at least two non-identical inserts. The shaft structure has a cavity and vibrates in response to the receipt of an input of a predetermined frequency such that at least two second bending mode anti-nodes are generated in spaced relation to one another along the longitudinal axis of the shaft structure. Each of the inserts is disposed within the longitudinally extending cavity at a position that approximately corresponds to an associated one of the anti-nodes. A method for attenuating noise transmission from a vehicle driveline is also disclosed.

11 Claims, 4 Drawing Sheets

PROPSHAFT ASSEMBLY WITH VIBRATION ATTENUATION AND ASSEMBLY METHOD THEREFOR

CROSS-REFERENCE TO RELATED APPLICATIONS

This is a continuation of U.S. patent application Ser. No. 10/097,701 filed Mar. 13, 2002, now U.S. Pat. No. 6,752,722 entitled "Foam Lined Propshaft".

FIELD OF THE INVENTION

The present invention generally relates to noise attenuation in vehicle drivelines and more particularly to an improved noise-attenuating propshaft and a method for its construction.

BACKGROUND OF THE INVENTION

Propshafts are commonly employed for transmitting power from a rotational power source, such as the output shaft of a vehicle transmission, to a rotatably driven mechanism, such as a differential assembly. As is well known in the art, propshafts tend to transmit sound while transferring rotary power. When the propshaft is excited a harmonic frequency, vibration and noise may be amplified, creating noise that is undesirable to passengers riding in the vehicle. Thus, it is desirable and advantageous to attenuate vibrations within the propshaft in order to reduce noise within the vehicle passenger compartment.

Various devices have been employed to attenuate the propagation of noise from propshafts including inserts that are made from cardboard, foam or resilient materials, such as rubber. The inserts that are typically used for a given propshaft are generally identical in their configuration (i.e., construction, size, mass and density) and are installed in the propshaft such that they are equidistantly spaced along the length of the propshaft. Construction in this manner is advantageous in that it greatly simplifies the manufacturer of the propshaft. Despite this advantage, several drawbacks remain.

For example, symmetric positioning of the identically-configured inserts within the propshaft typically does not maximize the attenuation of the vibration within the propshaft. Accordingly, it is desirable to provide an improved propshaft that attenuates vibrations within the propshaft to a larger degree than that which is taught by the prior art.

SUMMARY OF THE INVENTION

In one form, the teachings of the present invention provide propshaft assembly with a shaft structure and two non-identical inserts. The shaft structure has at least one cavity and vibrates in response to receipt of an input of a predetermined frequency such that a pair of second bending mode anti-nodes are generated in a spaced relation to one another along a longitudinal axis of the shaft structure. The inserts are disposed in the shaft structure and are positioned at a respective one of the anti-nodes. The inserts are configured to attenuate an amplitude of vibrations at the anti-nodes.

In another form, the teachings of the present invention provide a method for forming a propshaft assembly that includes: forming a shaft structure; forming a first insert; forming a second insert, the first and second inserts being non-identical; and inserting the first and second inserts into the shaft structure in an axially spaced-apart relation to one another.

In yet another form, the teachings of the present invention provide method for reducing vibration in a vehicle driveline that includes: providing a shaft assembly with a shaft structure; coupling the shaft structure to a power transmitting device, the power transmitting device including a pair of meshing gears; transmitting rotary power between the shaft assembly and the power transmitting device, the meshing gears thereby generating gear mesh vibration that is transmitted to the shaft assembly; determining a location of a first bending anti-node and a second bending anti-node along a length of the shaft structure; inserting a first insert at the first bending anti-node; and inserting a second insert at the second bending anti-node, the first and second inserts being non-identical.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENTS

Figure 1:
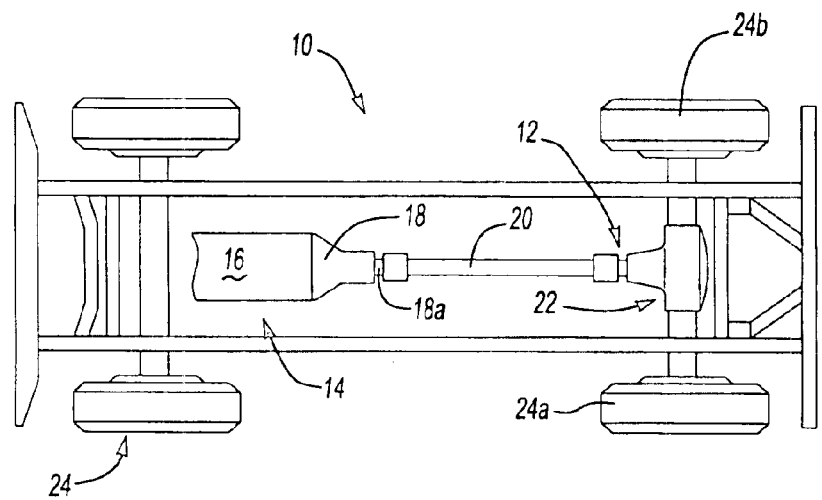
FIG. 1 is a schematic illustration of an exemplary vehicle constructed in accordance with the teachings of the present invention.

With reference to FIG. 1 of the drawings, a vehicle having a propshaft assembly that is constructed in accordance with the teachings of the present invention is generally indicated by reference numeral 10. The vehicle 10 includes a driveline 12 drivable via a connection to a power train 14. The power train 14 includes an engine 16 and a transmission 18. The driveline 12 includes a propshaft assembly 20, a rear axle 22 and a plurality of wheels 24. The engine 16 is mounted in an in-line or longitudinal orientation along the axis of the vehicle 10 and its output is selectively coupled via a conventional clutch to the input of the transmission 18 to transmit rotary power (i.e., drive torque) therebetween. The input of the transmission 18 is commonly aligned with the output of the engine 16 for rotation about a rotary axis. The transmission 18 also includes an output 18a and a gear reduction unit. The gear reduction unit is operable for coupling the transmission input to the transmission output at a predetermined gear speed ratio. The propshaft assembly 20 is coupled for rotation with the output 18a of the transmission 18. Drive torque is transmitted through the propshaft assembly 20 to the rear axle 22 where it is selectively apportioned in a predetermined manner to the left and right rear wheels 24a and 24b, respectively.

Figure 2:
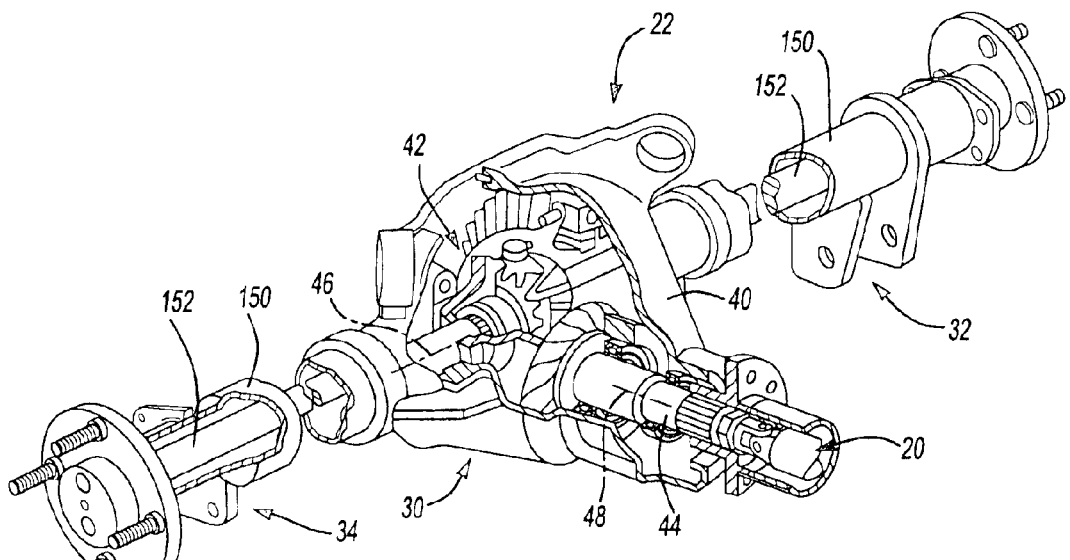
FIG. 2 is a top partially cut-away view of a portion of the vehicle of FIG. 1 illustrating the rear axle and the propshaft in greater detail.
Figure 3:
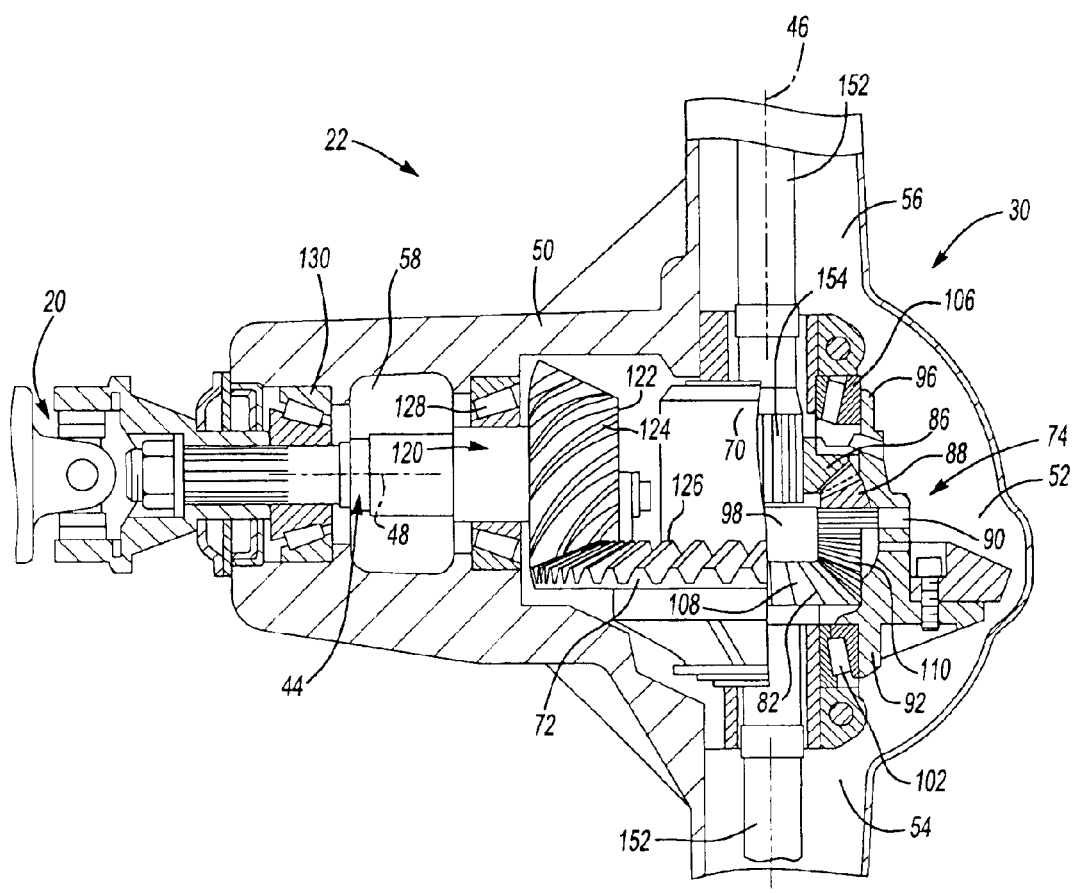
FIG. 3 is a sectional view of a portion of the rear axle and the propshaft.

With additional reference to FIGS. 2 and 3, the rear axle 22 is shown to include a differential assembly 30, a left axle shaft assembly 32 and a right axle shaft assembly 34. The differential assembly 30 includes a housing 40, a differential unit 42 and an input shaft assembly 44. The housing 40 supports the differential unit 42 for rotation about a first axis 46 and further supports the input shaft assembly 44 for rotation about a second axis 48 that is perpendicular to the first axis 46.

The housing 40 is initially formed in a suitable casting process and thereafter machined as required. The housing includes a wall member 50 that defines a central cavity 52 having a left axle aperture 54, a right axle aperture 56, and an input shaft aperture 58. The differential unit 42 is disposed within the central cavity 52 of the housing 40 and includes a case 70, a ring gear 72 that is fixed for rotation with the case 70, and a gearset 74 that is disposed within the case 70. The gearset 74 includes first and second side gears 82 and 86 and a plurality of differential pinions 88, which are rotatably supported on pinion shafts 90 that are mounted to the case 70. The case 70 includes a pair of trunnions 92 and 96 and a gear cavity 98. A pair of bearing assemblies 102 and 106 are shown to support the trunnions 92 and 96, respectively, for rotation about the first axis 46. The left and right axle assemblies 32 and 34 extend through the left and right axle apertures 54 and 56, respectively, where they are coupled for rotation about the first axis 46 with the first and second side gears 82 and 86, respectively. The case 70 is operable for supporting the plurality of differential pinions 88 for rotation within the gear cavity 98 about one or more axes that are perpendicular to the first axis 46. The first and second side gears 82 and 86 each include a plurality of teeth 108 which meshingly engage teeth 110 that are formed on the differential pinions 88.

The input shaft assembly 44 extends through the input shaft aperture 58 where it is supported in the housing 40 for rotation about the second axis 48. The input shaft assembly 44 includes an input shaft 120, a pinion gear 122 having a plurality of pinion teeth 124 that meshingly engage the teeth 126 that are formed on the ring gear 72, and a pair of bearing assemblies 128 and 130 which cooperate with the housing 40 to rotatably support the input shaft 120. The input shaft assembly 44 is coupled for rotation with the propshaft assembly 20 and is operable for transmitting drive torque to the differential unit 42. More specifically, drive torque received the input shaft 120 is transmitted by the pinion teeth 124 to the teeth 126 of the ring gear 72 such that drive torque is distributed through the differential pinions 88 to the first and second side gears 82 and 86.

The left and right axle shaft assemblies 32 and 34 include an axle tube 150 that is fixed to the associated axle aperture 54 and 56, respectively, and an axle half-shaft 152 that is supported for rotation in the axle tube 150 about the first axis 46. Each of the axle half-shafts 152 includes an externally splined portion 154 that meshingly engages a mating internally splined portion (not specifically shown) that is formed into the first and second side gears 82 and 86, respectively.

Figure 4:
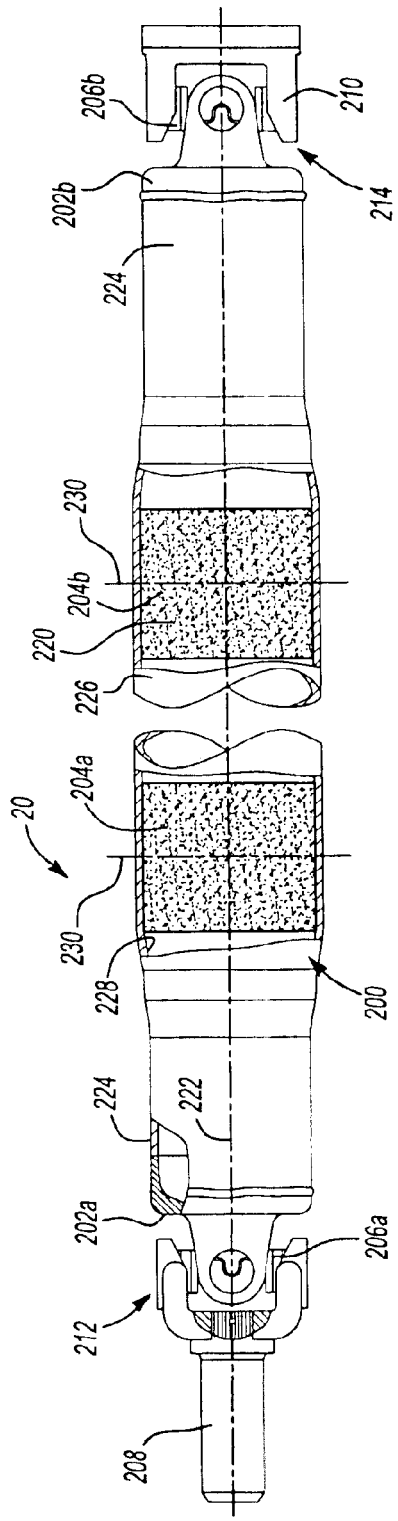
FIG. 4 is a top, partially cut away view of the propshaft.

With additional reference to FIG. 4, the propshaft assembly 20 is shown to include a shaft structure 200, first and second trunnion caps 202a and 202b, first and second insert members 204a and 204b, first and second spiders 206a and 206b, a yoke assembly 208 and a yoke flange 210. The first and second trunnion caps 202a and 202b, the first and second spider 206a and 206b, the yoke assembly 208 and the yoke flange 210 are conventional in their construction and operation and as such, need not be discussed in detail. Briefly, the first and second trunnion caps 202a and 202b are fixedly coupled to the opposite ends of the shaft structure 200, typically via a weld. Each of the first and second spiders 206a and 206b is coupled to an associated one of the first and second trunnion caps 202a and 202b and to an associated one of the yoke assembly 208 and the yoke flange 210. The yoke assembly, first spider 206a, and first trunnion cap 202a collectively form a first universal joint 212, while the yoke flange 210, second spider 206b and second trunnion cap 202b collectively form a second universal joint 214.

A splined portion of the yoke assembly 208 is rotatably coupled with the transmission output shaft 18a and the yoke flange 210 is rotatably coupled with the input shaft 120. The first and second universal joints 212 and 214 facilitate a predetermined degree of vertical and horizontal offset between the transmission output shaft 18a and the input shaft 120.

The shaft structure 200 is illustrated to be generally cylindrical, having a hollow central cavity 220 and a longitudinal axis 222. In the particular embodiment illustrated, the ends 224 of the shaft structure 200 are shown to have been similarly formed in a rotary swaging operation such that they are necked down somewhat relative to the central portion 226 of the shaft structure 200. The shaft structure 200 is preferably formed from a welded seamless material, such as aluminum (e.g., 6061-T6 conforming to ASTM B-210) or steel.

The first and second insert members 204a and 204b are fabricated from an appropriate material and positioned within the hollow cavity at locations approximately corresponding to the locations of the second bending mode anti-nodes 230. The configuration of each of the first and second insert members 204a and 204b is tailored to the anticipated maximum displacement of the shaft structure 200 at the anti-nodes 230 when the propshaft assembly 20 is excited at a predetermined frequency and the insert members 204a and 204b are not present. In this regard, the density, mass and/or resilience of the first and second insert members 204a and 204b is selected to provide a predetermined reduction in the anticipated maximum displacement of the shaft structure 200 at the anti-nodes 230.

In the example provided, the first and second insert members 204a and 204b are identically sized, being cylindrical in shape with a diameter of about 5 inches and a length of about 18 inches. The first and second insert members 204a and 204b are disposed within the hollow central cavity 220 and engage the inner wall 228 of the shaft structure 200. Preferably, the first and second insert members 204a and 204b engage the shaft structure 200 in a press-fit manner, but other retaining mechanisms, such as bonds or adhesives, may additionally or alternatively be employed.

Figure 5:
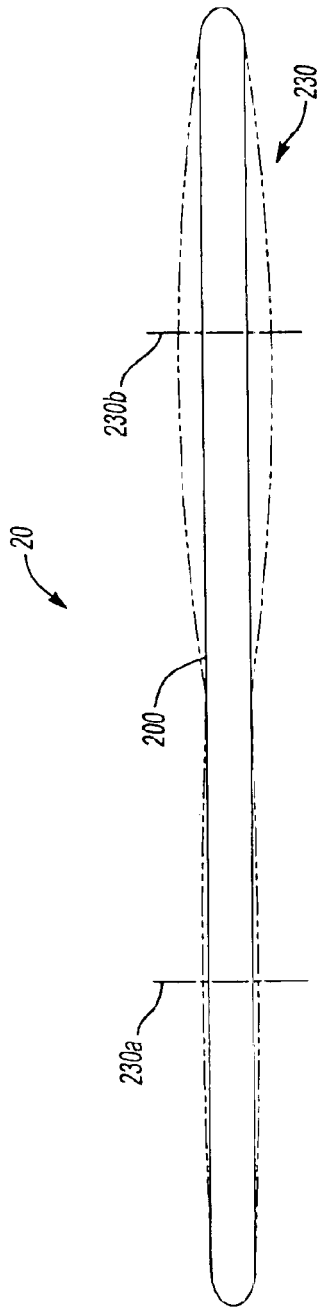
FIG. 5 is a schematic illustration of the maximum displacement associated with the bending mode of the propshaft.

The predetermined frequency at which vibration dampening is based is determined by monitoring the noise and vibration of the propshaft assembly 20 while performing a speed sweep (i.e., while operating the driveline 12 from a predetermined low speed, such as 750 r.p.m., to a predetermined high speed, such as 3250 r.p.m.). In the example provided, the first harmonic of the meshing of the pinion teeth 124 with the teeth 126 of the ring gear 72 was found to produce hypoid gear mesh vibration that excited the second bending and breathing modes of the propshaft assembly 20 when the propshaft assembly 20 was rotated at about 2280 r.p.m., as shown in FIG. 5. As a result of the configuration of the propshaft assembly 20, the anticipated maximum displacement of the anti-node 230b is shown to be significantly larger than the anticipated displacement of the anti-node 230a, which is generated in a spaced relation from anti-node 230b. Accordingly, if the first and second insert members 204a and 204b are not tailored to their respective anti-node 230, noise attenuation may not be as significant as possible and in extreme cases, could be counter-productive. As such, the first insert member 204a is constructed from a material that is relatively denser than the material from which the second insert member 204b is constructed. In the embodiment shown, the first insert member 204a is formed from a CF-47 CONFOR™ foam manufactured by E-A-R Specialty Composites having a density of 5.8 lb/ft³, while the second insert member 204b is formed from a CF-45 CONFOR™ foam manufactured by E-A-R Specialty Composites having a density of 6.0 lb/ft³. The foam material is porous, being of an open-celled construction, and has a combination of slow recovery and high energy absorption to provide effective damping and vibration isolation.

Figure 6:
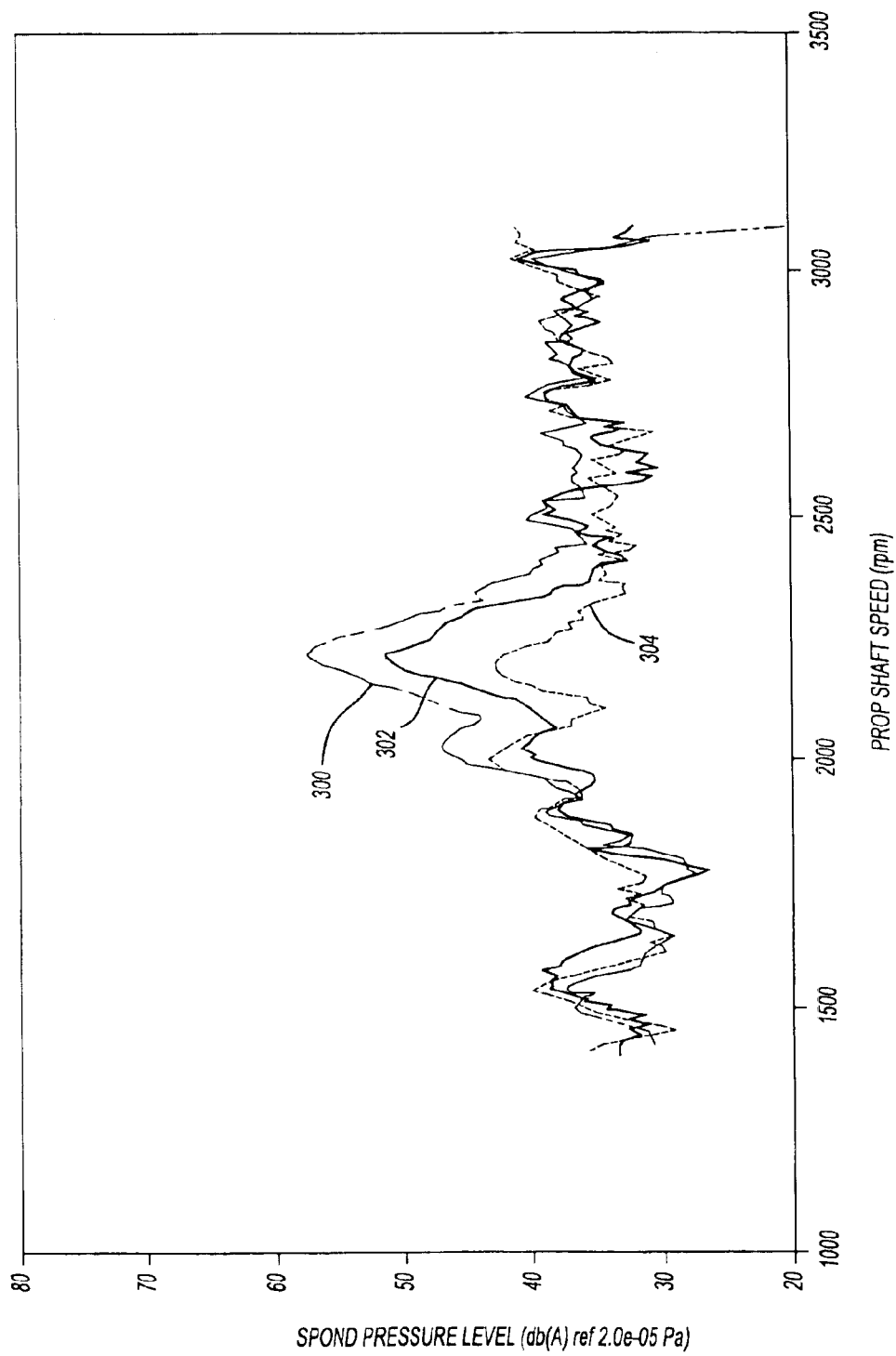
FIG. 6 is a plot illustrating noise as a function of the propshaft speed for three differently configured propshafts.

FIG. 6 is a plot that illustrates the noise attenuation that is attained by the propshaft assembly 20 as compared with an undamped propshaft assembly and a conventionally damped propshaft assembly. The plot of the undamped propshaft assembly is designated by reference numeral 300, the plot of the conventionally damped propshaft assembly is designated by reference numeral 302 and the plot of the propshaft assembly 20 is designated by reference numeral 304. The undamped propshaft assembly lacks the first and second insert members 204a and 204b but is otherwise configured identically to the propshaft assembly 20. The conventionally damped propshaft assembly includes a single foam damping insert that is approximately 52 inches long and approximately centered within the propshaft. The foam insert has a density of about 1.8 lbs/ft³ and provides a degree of dampening that is generally similar to other commercially-available damped propshaft assemblies. Notably, the propshaft construction methodology of the present invention provides significant noise reduction at the predetermined frequency as compared with the undamped and conventionally damped propshaft assemblies.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A method for forming a propshaft assembly comprising:
    forming a hollow shaft structure;
    determining a location of a pair of second bending mode anti-nodes along a length of the shaft structure;
    locating a first insert within the shaft structure at a first one of the second bending mode anti-nodes; and
    locating a second insert within the shaft structure at a second one of the second bending mode anti-nodes;
    wherein each of the first and second inserts are each rotationally balanced and wherein the first and second inserts are non-identical in order to reduce displacement at the anti-nodes.

2. The method of claim 1, wherein each of the first and second inserts has a length, a mass, a density and a resilience, and wherein at least one of the length, the mass, the density and the resilience of the first insert is different than that of the second insert.

3. The method of claim 2, wherein at least one of the first and second inserts is press-fit to the shaft structure.

4. A method for reducing vibration in a vehicle driveline comprising:
    providing a shaft assembly with a shaft structure;
    coupling the shaft structure to a power transmitting device, the power transmitting device including a pair of meshing gears;
    transmitting rotary power between the shaft assembly and the power transmitting device, the meshing gears thereby generating gear mesh vibration that is transmitted to the shaft assembly;
    determining a location of a pair of second bending mode anti-nodes along a length of the shalt structure;
    inserting a first insert at a first one of the second bending mode anti-nodes; and
    inserting a second insert at a second one of the second bending anti-nodes, the first and second inserts being non-identical in order to reduce displacement at the anti-nodes.

5. The method of claim 4, wherein each of the first and second inserts has a length, a mass, a density and a resilience, and wherein at least one of the length, the mass, the density and the resilience of the first insert is different than that of the second insert.

6. The method of claim 5, wherein at least one of the first and second inserts is press-fit to the shaft structure.

7. A method for assembly a propshaft assembly comprising:
    providing a shaft structure:
    positioning a first insert member at a first position, the first position being located at a first one of a pair of second bending mode anti-nodes; and
    positioning a second insert member at a second position, the second position being located at a second one of a pair of second bending mode anti-nodes, said first insert member being non-identical to the second insert member in order to reduce displacement at the anti-nodes.

8. The method of claim 7 wherein each of the first and second insert members has a length, a mass and a density, and wherein at least one of the length, the mass and the density of the first insert member is different than that of the second insert member.

9. The method of claim 7 wherein each of the first and second insert members has an outer surface adapted to engage an inner surface of the shaft structure.

10. A method for assembling a propshaft assembly comprising:
    providing a hollow shaft;
    causing the shaft to vibrate in response to receipt of an input of a predetermined frequency so as to generate a pair of second bending mode anti-nodes in spaced relation along the length of the shaft;
    inserting a first insert member at a first position within the hollow shaft corresponding to a first one of the second bending mode anti-nodes, the first insert member being selected from a material adapted to attenuate vibration at the first position; and inserting a second insert member at a second position within the hollow shaft corresponding to a second one of the second bending mode anti-nodes, the second insert member being selected from a material adapted to attenuate vibration at the second position wherein the first and second insert members are non-identical in order to reduce displacement at the anti-nodes.

11. The method of claim 10 wherein the first inset member is made from a material having at least one of a length, a density or a mass characteristic that is different than that of the material from which the second insert member is made.

* * * * *